Patented Dec. 4, 1934

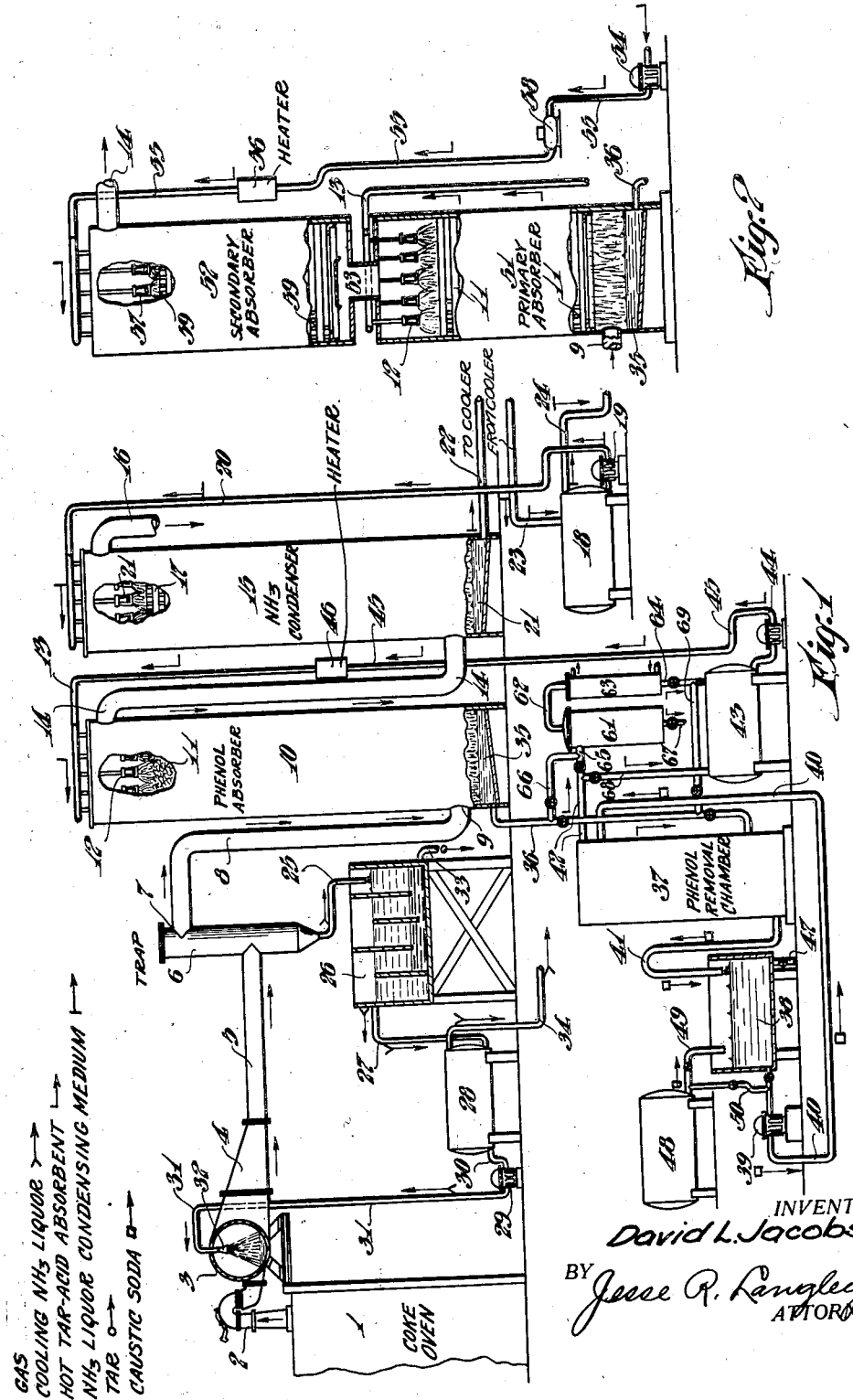
Dec. 4, 1934.    D. L. JACOBSON    1,983,375
GAS PURIFICATION
Filed May 14, 1930
INVENTOR.
David L. Jacobson.
BY Jesse R. Langley
ATTORNEY.

1,983,375

UNITED STATES PATENT OFFICE 1,983,375

GAS PURIFICATION

David L. Jacobson, Pittsburgh, Pa., assignor to The Koppers Company of Delaware, a corporation of Delaware Application May 14, 1930, Serial No. 452,381

16 Claims. (Cl. 23—196)

My invention relates to the removal of tar acids from gases, especially hot raw fuel gases such as coal gas and coke oven gas.

It is general practice in the manufacture of coal gas or coke oven gas to pass the hot gases from the distilling chamber through a hydraulic main in which tar and/or liquor are circulated and where a considerable portion of the tar is removed from the gas, then through a suction main and tar trap where tar and liquor are separated from the gas. The gas which is then usually at a temperature of about 80° C. is further cooled in some type of indirect or direct cooler resulting in the condensation of ammonia liquor usually with a further quantity of tar.

Ammonia liquor produced in this way contains varying amounts of tar acids such as phenols, cresols and their homologues, generally equivalent to about two grams of phenol per liter. When such ammonia liquor is distilled for the recovery of ammonia, a still waste containing phenolic compounds is produced which is a nuisance and very difficult to dispose of because of existing regulations concerning stream pollution.

An object of my invention is to provide a process of removing tar acids from hot fuel gases containing ammonia whereby the ammonia may be subsequently condensed in the form of ammonia liquor practically free from tar acids.

A second object of my invention is to provide a continuous and cyclic process of removing tar acids from gases, especially from hot fuel gases.

Another object of my invention is to provide a process of removing tar acids from hot fuel gases such as raw coke oven gas containing ammonia, water vapor, and tar acids, in such manner that part or all of the ammonia and water present can subsequently be condensed into liquor substantially free from phenol and the like.

A further object of my invention is to provide means for removing tar acids from ammonia-containing gases by contacting the gases with a suitable absorbent liquid at such temperature that other constituents present in the gas remain substantially uncondensed, and suitable apparatus therefor.

My invention has for further objects such other operative advantages and results as may hereinafter be found to obtain.

With these and other objects in view I now describe with reference to the accompanying drawing, a preferred method by which my invention may be practiced. In the drawing, Figure 1 is a more or less diagrammatic view, partly in elevation and partly in vertical section, of apparatus that may be used in an improved process of gas manufacture and ammonia liquor recovery according to my invention; and Fig. 2 is a similar view of a modified form of a portion of the apparatus shown in Fig. 1.

Similar numerals designate similar parts in both of the views of the drawing.

Referring to Fig. 1, gas formed in a distilling chamber 1 passes through an ascension pipe 2 to a hydraulic main 3 where it is brought into contact with recirculated tar and liquor and a large portion of the tar especially the heavy or higher-boiling fractions thereof is condensed from the gas.

The gas and circulating liquid pass from the hydraulic main 3 through an offtake 4 and a main 5 to a separator or trap 6 in which the gas and liquid are separated by gravity.

The gas passes through an upper outlet 7 from the trap 6 into a pipe 8 from which it flows through the inlet 9 into an absorber 10, the interior of which is filled with suitably spaced contact media such as wooden hurdles or lathe turnings 11.

During its upward passage through the packing 11 of the absorber 10, the gas is brought into intimate contact with a countercurrent of hot absorbent liquid introduced into the absorber 10 by means of a conduit 13 and suitable distributing devices 12, by which the tar acids contained in the gas are substantially removed.

The gas passing from the absorber 10 through a conduit 14 and substantially free of tar acids enters a cooler 15, passes through the interior of the cooler in which ammonia and water vapor are condensed to produce ammonia liquor and out through a pipe 16 after which it may be further treated for the removal of remaining ammonia and/or other constituents or otherwise disposed of as desired.

The cooler 15 may be of the indirect type, or the direct type. In the present instance, a cooler of the direct type is illustrated and the interior of the cooler 15 is filled with suitable contact material such as a packing of wooden hurdles 17. The dephenolized gas entering the cooler 15 near the bottom thereof passes upwardly through the packing 17 where it comes into intimate contact with cooling water delivered from a cooling water circulating tank 18 by a pump 19 through a pipe 20 and suitable distributing devices 21.

The cooling water is maintained at a temperature substantially lower than that of the gas entering the cooler 15 so that ammonia and water are condensed from the gas by contact with the countercurrently circulated cooling water. The cooling water and the condensate collect together in a sump 21 near the bottom of the cooler 15 from which they are simultaneously withdrawn through a conduit 22 to a cooler (not shown) by means of which the temperature of the combined liquid is reduced as desired.

The cooled water returns through a conduit 23 and enters the circulating tank 18 from which it is recirculated by the pump 19 as described above. Surplus liquor, formed by condensation of moisture and ammonia from the gas, is withdrawn through an overflow pipe 24 from the tank 18.

This ammonia liquor withdrawn from the cooling system through the overflow pipe 24, having been condensed from gas from which the tar acids had previously been removed, is substantially free of tar acids and may be disposed of as desired. When such liquor is distilled for the recovery of ammonia, the still waste formed contains no appreciable quantity of phenolic compounds and in consequence is not difficult of disposal.

The tar and liquor separated from the hot gas in the trap 6 pass downwardly through a pipe 25 into a hot drain tank 26 in which the tar is partly separated from the liquor. This liquor from which the tar has been more or less removed passes out of the drain tank 26 through a pipe 27 into a flushing liquor circulating tank 28 from which it is withdrawn by a pump 29 through a pipe 30 and delivered through a pipe 31 to a spray 32 or other suitable means of distribution in the hydraulic main 3. Tar may be withdrawn from the hot drain tank 26 through a pipe 33 when desired. Excess flushing liquor can be withdrawn from tank 28 through a pipe 34.

It will be obvious to those skilled in the art that the treatment of the gas up to the point where the gas enters the absorber 10 is simply the customary and well known procedure of the art. That is to say, the gases are cooled in the mains 3 and 5 by means of liquor introduced through the sprays 32 in the usual manner. While means for removing any excess ammonia liquor which may from time to time be produced is provided in the conduit 34, what normally takes place is that the hot gases leaving the coke ovens are cooled until they are saturated with moisture, during the course of which cooling the greater part of the tar contained in the gases is condensed. In ordinary operation no excess of ammonia liquor is produced, the cooling taking place by evaporation of the liquor.

As is well known, the effect of the treatment received by the gas in the mains 3 and 5 is to reduce the temperature of the gas to around 80° C. This temperature of course varies somewhat with atmospheric conditions and may fall as low as 75° C. and may rise as high as 90° C., but 80° C. is a typical and representative figure. The gases are saturated with moisture at this temperature and if subjected to cooling at this point would produce aqueous ammoniacal condensate containing tar acid.

The hot oil or other absorbent liquid containing the tar acids removed from the hot gas in the absorber 10 collects in a sump 35 near the bottom of the absorber 10. From this sump 35, the fouled absorbent liquid passes through a conduit 36 to a treating chamber 37 in which the oil is reconditoned by the removal of the tar acids therefrom.

The treating chamber 37 may be in the form of a reaction tank in which the tar acids are removed from the fouled oil by contact with a suitable alkaline solution such as caustic soda. The alkaline solution is withdrawn from a circulating tank 38 by a pump 39 and delivered through a pipe 40 to a point in the chamber 37 near its upper end whence it passes downward through the interior of said chamber and is discharged from the lower end thereof through a seal 41 to the circulating tank 38.

The fouled oil from the absorber 10 entering the chamber 37 through the pipe 36 passes upwardly countercurrent to the flow of alkaline solution and is thereby substantially freed of tar acids. The reconditioned oil then passes out through pipes 42 and 68 to an absorbent oil circulating tank 43. From the tank 43 the oil is delivered by a pump 44 through a pipe 45, a heater 46, the pipe 13 and the distributing devices 12 into the absorber 10.

The reconditioned oil from the treating chamber 37 may be further purified if desired before returning it to the oil recirculating tank 43 by distillation in a still 61. In this instance the oil passes from the pipe 42 through a pipe 65 into the the still 61. Vapors from the still 61 pass through a pipe 62 to a condenser 63, and condensate is returned to the circulating tank 43 through a pipe 64. Residue may be withdrawn from the still 61 through a pipe 67.

Or I may prefer to pass the fouled absorbent liquid from the absorber 10 through the pipe 36 to a pipe 66, thence into the still 61 where it is distilled without previous treatment in the chamber 37. Vapors from the still 61 pass through the pipe 62 to the condenser 63, and residue is withdrawn from the still 61 through the pipe 67 as described hereinbefore. The liquid condensed in the condenser 63 may pass through the pipe 64 to the absorbent circulating tank 43 to be recirculated over the absorber 10 as described hereinbefore, or as an alternative it may pass from the pipe 64 through a pipe 69 to the pipe 36, thence into the treating chamber 37 from which it returns to the tank 43 through pipes 42 and 68.

As a further alternative, I may return part or all of the used absorbent from the absorber 10 to the circulating tank 43 without treatment, through the pipes 36, 69 and 64 as shown. In this instance, the portion of used absorbent not so returned may be permitted to pass on through the pipe 36 into the treating chamber 37 and thereafter returned to the circulating tank 43 directly through pipes 42 and 68, or after distillation in the still 61 as described hereinabove, or it may be otherwise disposed of.

The function of the heater 46 is to make the temperature of the absorbent liquid entering the absorber 10 equal to or higher than that of the gas to prevent condensation of ammonia, water, and the like from the gas. If, for example, the gas enters the absorber at 80° C., the heater 46 should be adjusted to maintain the temperature of the oil at 80° to 90° C.

Alkali metal salts, for example, sodium phenolate, of the tar acids removed from the oil in the treating chamber 37 will be formed in the alkaline solution circulated. When the concentration of these salts builds up to such an extent that the solution is no longer efficacious in removing tar acids from the oil, or at any other time desired, part or all of the solution in use may be withdrawn from the caustic circulating tank 38 through a pipe 47 to be treated for the recovery of tar acids or otherwise disposed of.

Fresh caustic may be added to the system as needed from a caustic storage tank 48 through a pipe 49 or 50.

Fig. 2 illustrates a modified form of absorber that may be substituted for absorber 10 in Fig. 1 to remove tar acids from the gas. In this instance, the gas from the separator 6 passes through the conduit 8 and enters the lower section 51 of the modified absorber through the inlet 9. The gas after passing upward through a countercurrent of circulating absorbent liquid in the lower section 51 of the absorber leaves the lower section 51 and enters an upper section 52 through a connecting passage 53.

Into the upper section 52 of the modified absorber (Fig. 2), fresh or reconditioned absorbent liquid is introduced by a pump 54 from a tank (not shown) through a pipe 55, a heater 56 and suitable distributing means 57. This addition of fresh absorbent may be continuous or it may be intermittent and controlled by a meter-regulator 58 or other suitable means.

The fresh absorbent from the distributors 57 passes down over the contact media such as wooden hurdles 59 with which the interior of this section 52 of the absorber is packed, countercurrently to the flow of gas. The gas, having already received a treatment in the lower section 51 of the modified absorber similar to that described for absorber 10 of Fig. 1, thus receives a further treatment in the upper section 52 of the modified absorber with fresh absorbent and passes out through the pipe 14 to a cooler or condenser (not shown) very completely purified of tar acids.

The absorbent liquid introduced into the upper section 52 of the absorber passes downward through the packing 59 and the connecting passage 53 into the lower section 51 of the absorber where it mingles with the absorbent liquid there circulated. The combined absorbent then passes downward through the packing 11 to a sump 35 from which it is withdrawn through a pipe 36 to be reconditioned as described hereinabove. After reconditioning and reheating to the desired temperature, the absorbent is returned through pipe 13 and distributing devices 12 to the interior of the absorber.

It is obvious that various arrangements of the apparatus shown and described are possible. For instance, it is immaterial whether or not the two sections of the absorber shown in Fig. 2 are superimposed. Likewise, the sumps pictured in the absorbers and cooler could be placed elsewhere or in some instances omitted. It is not my intention to limit the means of control of intermittent additions of absorbent to the absorber in Fig. 2 to the use of a meter-regulator. Any suitable means, for example, a flush tank, may be substituted.

As contact media in the cooler and absorber, spiral tile packing, coke, or other suitably spaced packing material may be used in place of the lathe turnings and wooden hurdles mentioned hereinabove.

It is apparent that in the apparatus of Fig. 1 the use in the treating chamber 37 of a caustic alkaline solution having greater density than the absorbent treated is contemplated. If it is desired to use a caustic solution having less density than the absorbent liquid, it is only necessary to change the connections to the chamber.

As the absorbent liquid for removing tar acids from hot fuel gases according to my invention, I prefer to use an oil, such as a suitable coal tar distillate. For example, a coal tar distillate that is especially suitable is one boiling from 200° to 300° C. which has previously been washed with caustic soda or otherwise treated to remove tar acids or phenol. A water gas tar distillate or any other type of scrubbing oil having a suitable boiling point range and solvent action on tar acids may, however, be substituted for the coal tar distillate.

The absorbent can be cyclically used over and over again, and the fouled oil can be regenerated or reconditioned, when desired, by treatment with caustic soda as described hereinbefore or by other means.

If because the temperature of the absorbent oil has been allowed to get too low or for any other reason heavy tar or other undesired impurities collect in the oil, it may be desirable at times to redistill the oil to free it from said impurities. This may be accomplished before or after removal of tar acids from the absorbent in the treating chamber, or independently thereof, as described hereinabove. Or in some instances it may be preferable to run the absorbent oil into a decanter or settling tank in which heavy tar and pitch are removed by gravity before returning the oil to the circulating tank.

I may alternatively use suitable alkaline liquids, such as liquids containing alkaline compounds which react or combine with tar acid to form compounds having lower vapor pressures with respect to tar acid than free tar acid, for the absorption of tar acid from the gas. As an example of carrying out the process with an alkaline absorbent, the hot gas from which most of the tar has been removed is treated in a suitable absorber with a hot aqueous solution of sodium carbonate which absorbs tar acid but does not remove a substantial part of the ammonia.

The used carbonate solution containing tar acids removed from the gas may be added to a liquid purification solution to make up for soda losses, or regenerated by heating and/or aeration or otherwise and used over again, or otherwise disposed of as may be desired. Other water soluble or water miscible bases may also be used to remove tar acids from gases in a similar manner according to my invention.

As a further example of carrying out my invention with alkaline absorption media, I may use basic materials which are comparatively insoluble in water such as dimethyl aniline, xylidines, pyridine, quinoline and other high boiling organic bases containing nitrogen. These are preferably used in solution in a scrubbing oil of suitable boiling range as, for instance, certain tar distillates.

I may add such organic bases to the scrubbing oil either as fairly pure substances or in suitable distillates of high temperature or low temperature coal tars. Distillates of other tars containing organic bases may also be used. Organic bases of the kind desired are usually found in coal tar distillates boiling about 200 to 250° C.

Fouled scrubbing oils containing these nitrogenous organic bases may be reconditioned for further use by treatment with caustic solution or by distillation as described elsewhere herein or otherwise.

Regardless of the type of absorbent liquid used, but especially when an oil is used as the absorbent, it is not always necessary or desirable to recondition all the circulated absorbent, whether one-stage or multiple-stage absorption is practiced. For instance, with a two-stage absorber such as is shown in Fig. 2, it may be desirable to recondition only that quantity of absorbent which is to be withdrawn from circulation over the lower section and introduced into the upper section.

Under certain circumstances, I may prefer to recondition the absorbent liquid by methods other than distillation, or treatment with caustic, or combinations thereof. For example, I may treat the liquid with air or other gas at normal or elevated temperatures, or I may extract the tar acids from the absorbent liquid with some other liquid menstruum, or I may reduce the vapor pressure of tar acids contained in the absorbent by other methods known to the art.

Although both ammonia and water vapor are assumed to be present in the hot fuel gases whose treatment is described above, phenols or other tar acid can be removed from gases in which either ammonia or water is not present by the methods described. However, a suitable application of my invention is in connection with the manufacture of fuel gases from coal, and the purification thereof, wherein by means of my invention the tar acids contained in the fuel gases are removed prior to the condensation of ammonia and water therefrom in the form of ammonia liquor. The ammonia liquor condensed from gases so treated is substantially free of tar acids and can be distilled for the recovery of ammonia without the formation of objectionable quantities of phenolic compounds in the still waste. This is an obvious advantage in that still waste substantially free of phenolic compounds can be discharged without danger of phenolic pollution of streams.

A further advantage resulting from the application of my invention is that other gas-plant effluents, such as final cooler water and waste water from benzol plants, are substantially uncontaminated with tar acid condensed from the gas treated, and consequently present no disposal problems.

On the other hand, when gas which has not been dephenolized is treated in the usual manner to condense ammonia liquor and to recover other by-products therefrom, the ammonia liquor as well as other aqueous condensates removed from the gas, such as final cooler water and benzol plant decanter water, are all contaminated with phenols and each presents a separate disposal problem. In the practice of the present invention, the single simple treatment of the gas described hereinabove readily removes all tar acid condensible at, above, or somewhat below the temperatures at which other constituents are removed from the gas in the usual by-product recovery processes, and thereby, in one step, all of the difficulties usually encountered in the disposal of coke plant effluents and the like are eliminated.

It will be obvious to those skilled in the art that various modifications may be made in the several parts of my apparatus and in the several steps of my process without departing from the spirit of my invention, and it is intended that the claims shall cover such changes as may be reasonably included within the scope thereof.

I claim as my invention:

1. The process of treating fuel gas such as that produced by the distillation of coal in coking retort ovens and the like for the removal of tar, tar acids, and ammonia contained therein, which comprises partially cooling the raw gases to remove the greater portion of the tar, then scrubbing the partially cooled gas without further cooling thereof under conditions insuring substantially complete removal by said scrubbing of tar acid not removed as a part of said tar without producing aqueous condensate from the gas, and finally cooling the gases in a separate stage whereby a condensate is obtained consisting of aqueous ammoniacal liquor substantially free from tar acid.

2. The process of treating gases containing ammonia and tar acid, which comprises treating the hot gases with a tar distillate substantially free from tar acid at a temperature to prevent condensation of ammonia and water and under conditions insuring substantially complete removal of tar acid from the gas by said treatment, and then cooling the gases in a separate stage to condense ammonia.

3. The process of treating gases containing ammonia and tar acid, which comprises treating the hot gases with a tar distillate boiling between 200° and 300° C. to remove tar acid at a temperature to prevent condensation of ammonia and water and under conditions insuring substantially complete removal of tar acid from the gas by said treatment, and then cooling the gases in a separate stage to condense ammonia.

4. The process of treating gases containing ammonia and tar acid which comprises treating the hot gases with a tar distillate containing basic organic nitrogen compounds to remove tar acid at a temperature to prevent condensation of ammonia and water and under conditions insuring substantially complete removal of tar acid from the gas by said treatment, and then cooling the gases in a separate stage to condense ammonia substantially free from tar acid.

5. The process of treating gases containing ammonia and tar acid which comprises treating the hot gases with an oil containing basic organic nitrogen compounds to remove tar acid at a temperature to prevent condensation of ammonia and water and under conditions insuring substantially complete removal of tar acid from the gas by said treatment, and then cooling the gases in a separate stage to condense ammonia.

6. The process of treating gases containing ammonia and tar acid which comprises treating the hot gases with an oil having alkaline constituents to remove tar acid at a temperature to prevent condensation of ammonia and water and under conditions insuring substantially complete removal of tar acid from the gas by said treatment, and then cooling the gases in a separate stage to condense ammonia.

7. The process of treating gases containing ammonia and tar acid which comprises treating the hot gases with a liquid containing an alkali compound which reacts with tar acid to form a compound having a lower vapor pressure than that of the free tar acid to remove tar acid at a temperature to prevent condensation of ammonia and water and under conditions insuring substantially complete removal of tar acid from the gas by said treatment, and then cooling the gases to condense ammonia.

8. The process of treating gases containing ammonia and tar acid which comprises treating the hot gases with a sodium carbonate solution to remove tar acid at a temperature to prevent condensation of ammonia and water and under conditions insuring substantially complete removal of tar acid from the gas by said treatment, and then cooling the gases in separate stages to remove ammonia.

9. The process of treating hot fuel gases containing tar, tar acid, and ammonia, which process comprises partially cooling said gases and removing a substantial portion of the tar, then substantially completely removing tar acid from the gases by bringing the gases into contact with a tar distillate boiling between 200° and 300° C. and substantially free from tar acid at a temperature such that ammonia passes therethrough in the gases uncondensed, further cooling the gases and condensing ammonia therefrom in separate stages in the form of ammonia liquor substantially free of phenols, treating the used tar distillate to purify it of tar acid and other impurities and continuously recirculating the thereby regenerated and purified distillate for further treatment of gas.

10. The process of treating hot fuel gas containing tar, tar acid, ammonia, and water vapor which comprises removing heavy tar, scrubbing the gas with an absorbent liquid maintained at a temperature not lower than the temperature of the gas without condensing aqueous constituents of the gas and under conditions insuring complete removal thereby of substantially all tar acid which would condense at temperatures at which aqueous condensates separate from the gas during the subsequent purification thereof, and removing in a separate later stage ammonia and water from the gas substantially uncontaminated with tar acid.

11. The process of treating hot fuel gas containing tar acid, ammonia, and water vapor which comprises scrubbing the gas with an absorbent for tar acid maintained at a temperature not lower than the temperature of gas entering the scrubbing stage and thereby removing from the gas substantially all tar acid condensible at temperatures to which the gas is subjected during its subsequent purification without reducing the temperature of the gas, and then cooling the gas to condense ammonia liquor substantially free from tar acid.

12. In a process of treating hot fuel gas containing tar acid, ammonia, and water vapor the steps comprising recirculating an absorbent for tar acid through a stage in which it removes from the gas substantially all tar acid condensible at temperatures encountered during the subsequent purification of the gas without lowering the temperature of the gas and through a stage in which at least part of the absorbent is treated to reduce the vapor pressure of tar acid contained therein.

13. In a process of treating gas containing tar acid, ammonia, and water vapor comprising removing substantially all of the tar acid therefrom substantially without removal of ammonia or water by scrubbing the gas with an absorbent for tar acid maintained at a temperature at least as high as that of the gas, the steps comprising treating absorbent thereby contaminated with tar acid to reduce the vapor pressure of tar acid contained therein and returning the treated absorbent to remove tar acid from a further quantity of gas.

14. The process of treating gas containing tar acid, ammonia, and water vapor, which comprises contacting the gas with a recirculated absorbent for tar acid maintained at a temperature at least as high as that of the gas, contacting the gas with a further quantity of absorbent substantially uncontaminated with tar acid to complete the removal of tar acid therefrom substantially without condensation of ammonia or water, and removing ammonia and water from the gas substantially free from tar acid.

15. The process of removing tar acid from gas substantially without condensation of other constituents therefrom, which comprises continuously contacting the gas in a first stage with an absorbent for tar acid and thereby removing tar acid from the gas, contacting the gas in a second stage with a similar absorbent substantially free from tar acid and thereby substantially completely removing the residual tar acid from the gas, combining absorbent from said second stage with absorbent entering the first stage and passing the combined absorbent over the first stage, dividing the combined absorbent contaminated with tar acid removed from the gas into two parts, recirculating one of said parts over the first stage, treating the second of said parts to remove tar acid therefrom, and contacting the treated second part with a further quantity of gas in the said second stage, the absorbent in both stages being maintained at a temperature not substantially lower than that of the gas and at which aqueous constituents of the gas will not condense along with the removal of the tar acids thereof.

16. The process of treating fuel gas such as that produced by the distillation of coal in coking retort ovens and the like for the removal of tar, tar acids, and ammonia contained therein, which comprises initially subjecting the raw gases to contact with aqueous liquor to reduce the temperature of the gases to about 80° C., and to remove the greater portion of the tar therefrom, then scrubbing the gases with an oil having absorbent properties with respect to tar acids and under conditions insuring substantially complete removal of tar acid from the gas by said scrubbing of the gases with oil, said oil being introduced to the gases at a temperature not lower than that of the gases whereby tar acids are removed from the gases without simultaneous condensation of water or ammonia, and finally cooling the gases in a separate stage to effect the condensation of water and ammonia therefrom whereby an ammoniacal liquor is produced that is substantially free from tar acids.

DAVID L. JACOBSON.